(12) United States Patent
Wilson et al.

(10) Patent No.: US 8,282,487 B2
(45) Date of Patent: Oct. 9, 2012

(54) DETERMINING ORIENTATION IN AN EXTERNAL REFERENCE FRAME

(75) Inventors: Andrew Wilson, Seattle, WA (US); Steven Michael Beeman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 12/490,331

(22) Filed: Jun. 24, 2009

(65) Prior Publication Data

US 2010/0103269 A1    Apr. 29, 2010

Related U.S. Application Data

(63) Continuation of application No. 12/256,747, filed on Oct. 23, 2008.

(51) Int. Cl.
 *A63F 13/00*     (2006.01)
(52) U.S. Cl. ............................................. 463/39; 463/37
(58) Field of Classification Search .................... 463/36, 463/37, 39, 40
 See application file for complete search history.

(56) References Cited

U.S. PATENT DOCUMENTS

| | | | |
|---|---|---|---|
| 5,990,908 A | 11/1999 | Thingvold | |
| 6,148,280 A | 11/2000 | Kramer | |
| 6,181,343 B1 | 1/2001 | Lyons | |
| 6,195,104 B1 | 2/2001 | Lyons | |
| 6,269,172 B1 | 7/2001 | Rehg et al. | |
| 6,600,475 B2 | 7/2003 | Gutta et al. | |
| 6,678,059 B2 | 1/2004 | Cho et al. | |
| 6,693,284 B2 | 2/2004 | Tanaka | |
| 6,693,666 B1 | 2/2004 | Baker et al. | |
| 6,804,396 B2 | 10/2004 | Higaki et al. | |
| 6,888,960 B2 | 5/2005 | Penev et al. | |
| 7,007,236 B2 | 2/2006 | Dempski et al. | |
| 7,095,401 B2 | 8/2006 | Liu et al. | |
| 7,219,033 B2 | 5/2007 | Kolen | |
| 7,372,977 B2 | 5/2008 | Fujimura et al. | |
| 2003/0156756 A1 | 8/2003 | Gokturk et al. | |
| 2004/0001113 A1 | 1/2004 | Zipperer et al. | |
| 2004/0155902 A1 | 8/2004 | Dempski et al. | |
| 2004/0189720 A1 | 9/2004 | Wilson et al. | |
| 2005/0151850 A1 | 7/2005 | Ahn et al. | |
| 2005/0212753 A1 | 9/2005 | Marvit et al. | |
| 2005/0238201 A1 | 10/2005 | Shamaie | |
| 2005/0255434 A1 | 11/2005 | Lok et al. | |
| 2006/0007142 A1 | 1/2006 | Wilson et al. | |
| 2006/0012675 A1* | 1/2006 | Alpaslan et al. | ................ 348/51 |
| 2006/0036944 A1 | 2/2006 | Wilson | |
| 2006/0092267 A1 | 5/2006 | Dempski et al. | |

(Continued)

OTHER PUBLICATIONS

Romero, Joshua J., "How Do Motion-Sensing Video Game Controllers Work?", posted Dec. 18, 2006, retrieved at << http://scienceline.org/2006/12/18/motioncontrollers/ >>, 4 Pages.
"Gametrak Fusion 3D Wireless Motion Sensor Gaming", Posted Oct. 20, 2006, retrieved at << http://www.pcvsconsole.com/news.php?nid=3212 >>, 2 Pages.
Morris, et al., "User-Defined Gesture Set for Surface Computing", Application filed Aug. 4, 2008, U.S. Appl. No. 12/185,166.

(Continued)

*Primary Examiner* — James S McClellan
(74) *Attorney, Agent, or Firm* — Alleman Hall McCoy Russell & Tuttle LLP

(57) ABSTRACT

Orientation in an external reference is determined. An external-frame acceleration for a device is determined, the external-frame acceleration being in an external reference frame relative to the device. An internal-frame acceleration for the device is determined, the internal-frame acceleration being in an internal reference frame relative to the device. An orientation of the device is determined based on a comparison between a direction of the external-frame acceleration and a direction of the internal-frame acceleration.

24 Claims, 4 Drawing Sheets

U.S. PATENT DOCUMENTS

| | | | |
|---|---|---|---|
| 2006/0178212 | A1 | 8/2006 | Penzias |
| 2006/0252474 | A1* | 11/2006 | Zalewski et al. ............ 463/1 |
| 2007/0152157 | A1 | 7/2007 | Page |
| 2007/0230747 | A1 | 10/2007 | Dunko |
| 2007/0252898 | A1 | 11/2007 | Delean |
| 2008/0036732 | A1 | 2/2008 | Wilson et al. |
| 2008/0122786 | A1 | 5/2008 | Pryor et al. |
| 2008/0193043 | A1 | 8/2008 | Wilson |
| 2009/0121894 | A1 | 5/2009 | Wilson et al. |

OTHER PUBLICATIONS

Wilson, Andrew David., "Computer Vision-Based Multi-Touch Sensing Using Infrared Lasers" Application filed May 12, 2008, U.S. Appl. No. 12/118,955.

Wilson, et al., "Determining Orientation in an External Reference Frame", Application filed Oct. 23, 2008, U.S. Appl. No. 12/256,747.

Singh, Amit, "The Apple Motion Sensor as a Human Interface Device," http://osxbook.com/book/bonus/chapter10/ams2hid/, Mar. 2005.

* cited by examiner

DETERMINING ORIENTATION IN AN EXTERNAL REFERENCE FRAME

CROSS REFERENCE TO RELATED APPLICATION(S)

This application is a continuation of U.S. patent application Ser. No. 12/256,747 filed on Oct. 23, 2008, entitled "DETERMINING ORIENTATION IN AN EXTERNAL REFERENCE FRAME", the entire contents of which is hereby incorporated by reference.

BACKGROUND

A gyroscope can use angular momentum to assess a relative orientation of a device in a frame of reference that is internal to that device. However, even the most accurate gyroscopes available may accumulate small orientation errors over time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Determining orientation in an external reference frame is disclosed herein. An external-frame acceleration for a device is determined, the external-frame acceleration being in an external reference frame relative to the device. An internal-frame acceleration for the device is also determined, the internal-frame acceleration being in an internal reference frame relative to the device. An orientation of the device is determined based on a comparison between a direction of the external-frame acceleration and a direction of the internal-frame acceleration.

DETAILED DESCRIPTION

Figure 1A:
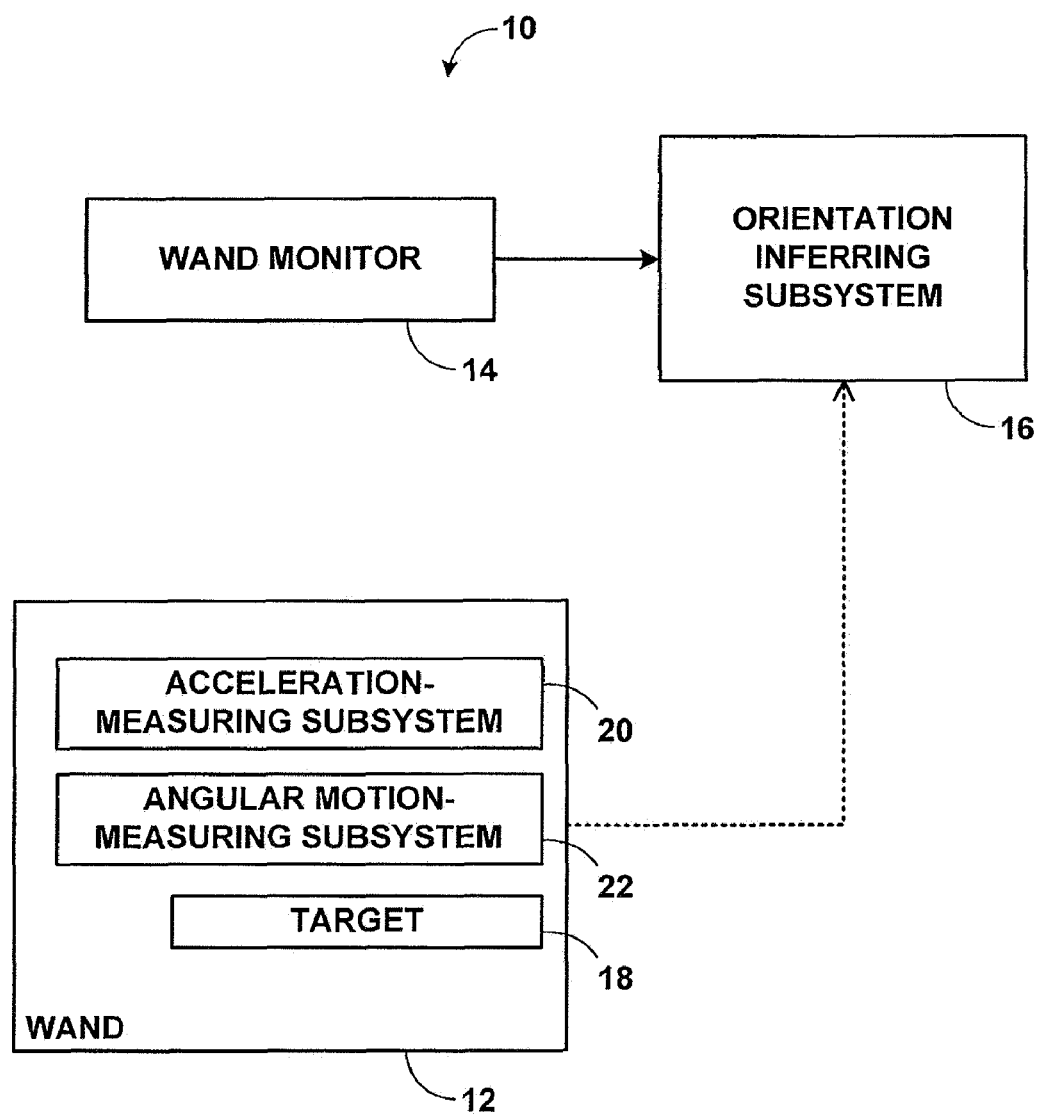
FIG. 1A schematically shows an orientation-determining computing system in accordance with an embodiment of the present disclosure.

FIG. 1 shows an orientation-determining computing system 10 including a wand 12, a wand monitor 14 and an orientation inferring subsystem 16. Orientation inferring subsystem 16 is configured to determine an orientation of wand 12 in a frame of reference that is external to the wand 12. In particular, the orientation inferring subsystem 16 may infer a coarse orientation of the wand 12 in the external reference frame by comparing acceleration information of the wand 12 in the external reference frame with acceleration information of the wand 12 in an internal reference frame.

The acceleration information in the external reference frame may be assessed by wand monitor 14. The wand monitor 14 may be configured to observe the wand 12 as the wand 12 moves relative to the wand monitor 14. Such observations may be translated into an external-frame acceleration for the wand. Any suitable technique may be used by the wand monitor 14 for observing the wand 12. As a nonlimiting example, the wand monitor 14 may be configured to visually observe the wand 12 with stereo cameras. In some embodiments, the wand 12 may include a target 18 that facilitates observation by the wand monitor 14.

The acceleration information in the internal reference frame may be assessed by the wand 12. The wand 12 may be configured to sense wand accelerations and report such sensed accelerations to orientation inferring subsystem 16. In some embodiments, the wand may include an acceleration-measuring subsystem 20 for measuring wand accelerations in a frame of reference that is internal to the wand 12.

In addition to determining a coarse orientation of the wand 12 by comparing wand accelerations in internal and external reference frames, the orientation inferring subsystem 16 may update the coarse orientation of the wand 12 based on angular motion information observed by the wand 12 itself. As such, the wand 12 may include an angular-motion measuring subsystem 22 for measuring angular motion of the wand 12 in a frame of reference that is internal to the wand. Even when such an angular-motion measuring subsystem 22 is included, the coarse orientation inferred using internal and external-frame accelerations may be used to limit errors that may accumulate if only the angular-motion measuring subsystem 22 is used.

The wand may be configured to serve a variety of different functions in different embodiments without departing from the scope of this disclosure. As a nonlimiting example, in some embodiments, computing system 10 may be a game system in which wand 12 is a game controller device for controlling various game functions. It is to be understood that the orientation inferring methods described herein may additionally and/or alternatively be applied to an orientation-determining computing system other than a game system, and the wand need not be a game controller in all embodiments.

Figure 1B:
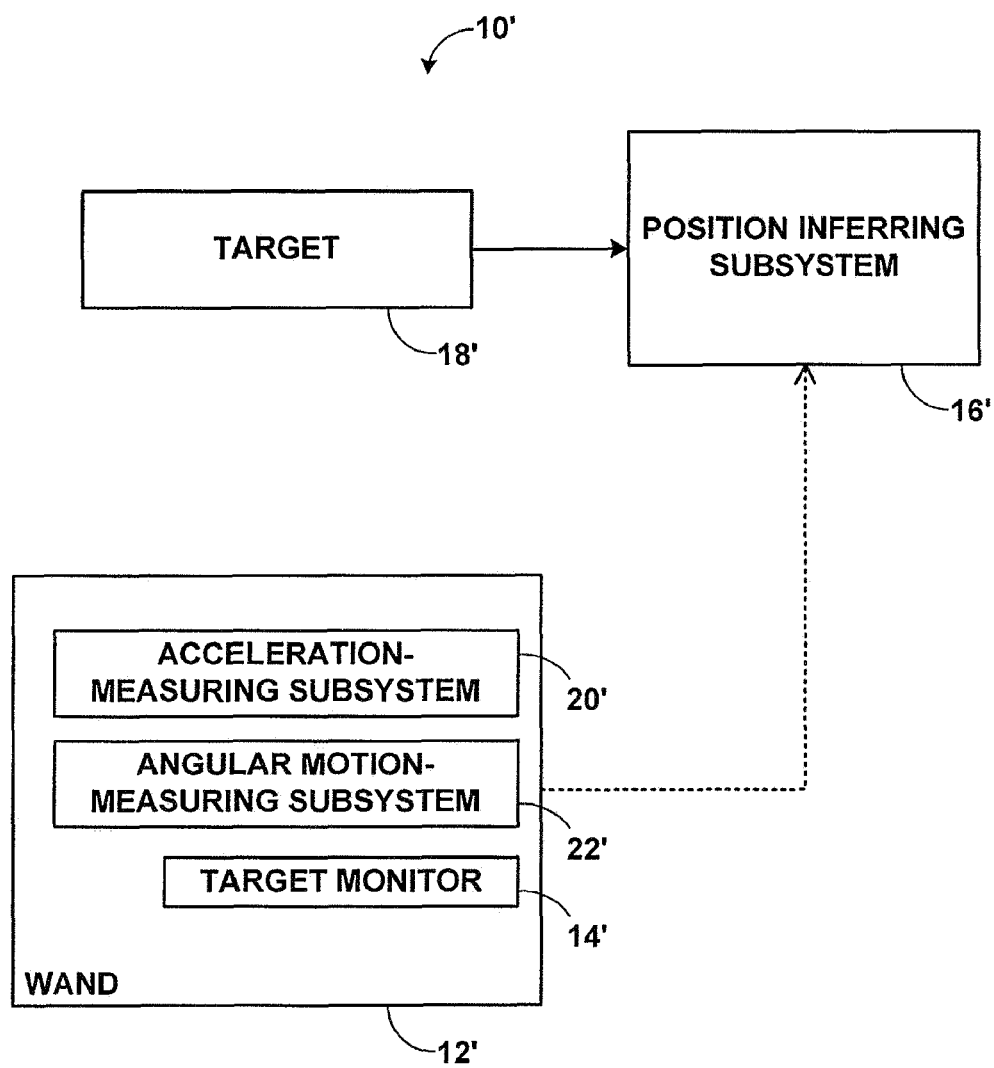
FIG. 1B schematically shows a position-determining computing system in accordance with another embodiment of the present disclosure.

Furthermore, it is to be understood that the arrangement shown in FIG. 1A is exemplary, and other arrangements are within the scope of this disclosure. As a nonlimiting example, FIG. 1B shows a position-determining computing system 10' in accordance with another embodiment of the present disclosure. Position-determining computing system 10' includes a wand 12', a target monitor 14' and a position inferring subsystem 16'. Position inferring subsystem 16' is configured to determine a position of wand 12' in a frame of reference that is external to the wand 12'. In particular, the position inferring subsystem 16' may infer a coarse position of the wand 12' in the external reference frame by comparing orientation information of the wand 12' in the external reference frame with acceleration information of the wand 12' in an internal reference frame.

In some embodiments, target 18' may include one or more LEDs (e.g., infrared LEDs) positioned in a fixed location, such as near a television or any other suitable location. In such embodiments, the wand 12' may include a target monitor 14' configured to view the target 18' and deduce an orientation of the wand based upon a relative position of the target 18' within the target monitor's field of view. Such information may be used in cooperation with acceleration information measured by an acceleration-measuring subsystem 20' and/or angular motion information measured by an angular-motion measuring subsystem 22' to infer a coarse position of the wand as discussed below with reference to inferring coarse orientation.

In yet other embodiments, a wand may include both a target and a target monitor, and/or both a target and a target monitor may be positioned at one or more locations external to the wand. In other words, the arrangements shown in FIGS. 1A and 1B may be at least partially combined, thus enabling direct deduction of both wand position and wand orientation, which may optionally be confirmed/verified with inferred position and inferred orientation, as described herein. Further, it should be understood that the relative positioning of targets, target monitors, wand monitors, and other components described herein may be varied from the specific examples provided herein without departing from the scope of the present disclosure.

Figure 2:
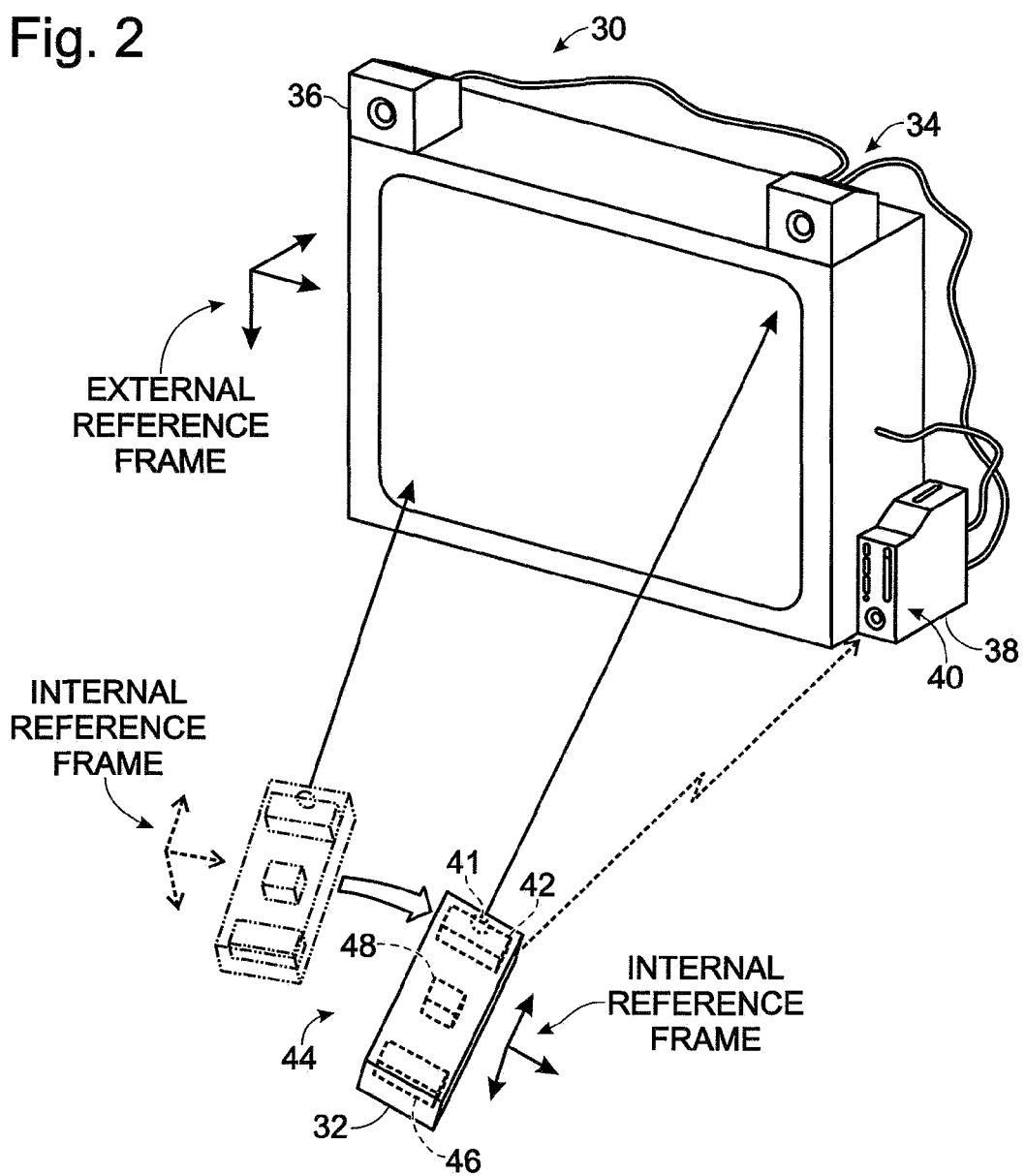
FIG. 2 shows an exemplary configuration of the orientation-determining computing system of FIG. 1.

FIG. 2 shows an example game system 30 including a controller 32, a controller monitor 34 including stereo cameras 36, and a gaming console 38 including an orientation inferring subsystem 40.

In such a game system 30, orientation inferring subsystem 40 is configured to infer a coarse orientation of controller 32 in an external reference frame relative to controller 32. In particular, the coarse orientation of the controller 32 in a television's, or other display's, reference frame may be inferred. The orientation inferring subsystem 40 infers the coarse orientation of the controller 32 by comparing acceleration information from an external reference frame relative to the controller 32 with acceleration information from an internal reference frame relative to the controller 32.

In the illustrated embodiment, orientation inferring subsystem 40 is configured to determine an external-frame acceleration of controller 32 using time-elapsed position information received from stereo cameras 36. While shown placed near a television, it should be understood that stereo cameras 36, or another wand/target monitor, may be placed in numerous different positions without departing from the scope of this disclosure.

The stereo cameras may observe a target 41 in the form of an infrared light on controller 32. The individual position of the target 41 in each camera's field of view may be cooperatively used to determine a three-dimensional position of the target 41, and thus the controller 32, at various times. Visually-observed initial position information and subsequent position information may be used to calculate the external-frame acceleration of the controller 32 using any suitable technique.

The following technique is a nonlimiting example for using initial position information and subsequent position information to determine an external-frame acceleration of the controller. Taking $\overline{X_0}$ to be a current position of controller 32 as observed by controller monitor 34 at a time $t_0$, and $\overline{X_{-1}}$ to be a previous position of controller 32 as observed by controller monitor 34 at a previous time $t_{-1}$, an expected position $\overline{X_0'}$ for controller 32 at a current time to can be calculated according to the following equation, $$\overline{X_0'} = \overline{X_{-1}} + \overline{V}(t_0 - t_{-1}).$$

Here, the velocity $\overline{V}$ is calculated from prior position information as follows, $$\overline{V} = \frac{(\overline{X_{-1}} - \overline{X_{-2}})}{(t_{-1} - t_{-2})},$$

where $\overline{X_{-2}}$ is a more previous position of the controller as observed by the controller monitor at a more previous time $t_{-2}$.

If it is determined that the expected position $\overline{X_0'}$ is not equal to the current position $\overline{X_0}$, then the difference may be a result of acceleration of controller 32. In such a case, the orientation inferring subsystem 40 determines an external-frame acceleration $\overline{a}$ of controller 32 at a current time $t_0$ be given by the following, $$\overline{a} = \frac{2(\overline{X_0} - \overline{X_0'})}{(t_0 - t_{-1})^2} + \overline{g},$$

where $\overline{g}$ is a gravitational acceleration.

Orientation inferring subsystem 40 is configured to determine an internal-frame acceleration of controller 32 from acceleration information received from controller 32. The controller 32 may obtain the internal-frame acceleration in any suitable manner. For example, the controller may include an acceleration-measuring subsystem configured to report acceleration information to the orientation inferring subsystem 40. In some embodiments, the acceleration-measuring subsystem may be a three-axis accelerometer 42 located proximate to the target 41, as schematically shown in FIG. 2.

Figure 3:
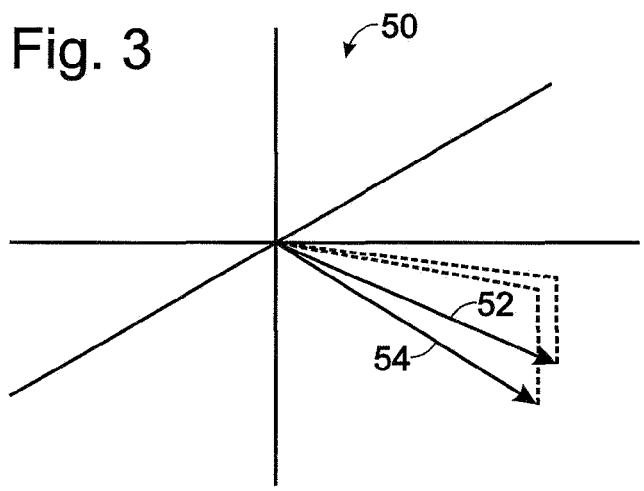
FIG. 3 shows a comparison of an external-frame acceleration vector and an internal-frame acceleration vector corresponding to the controller orientation of FIG. 2.

The orientation inferring subsystem 40 can determine a coarse orientation of controller 32 based on a comparison between a direction of the external-frame acceleration and a direction of the internal-frame acceleration. FIG. 3 shows an example of such a comparison 50 corresponding to the controller movement shown in FIG. 2. Vector 52 represents the direction of the external-frame acceleration and vector 54 represents the direction of the internal-frame acceleration. The misalignment between the external-frame acceleration and the internal-frame acceleration can be resolved to find any difference between the external reference frame and the internal reference frame. Accordingly, an orientation of the controller 32 can be inferred in the external frame of reference.

As a nonlimiting example, if stereo cameras 36 observe controller 32 accelerating due east without changing elevation or moving north/south; and if acceleration-measuring subsystem 20 reports that controller 32 accelerates to the right, without moving up/down or front/back; then orientation inferring subsystem 40 can infer that controller 32 is pointing toward the north. The above is a simplified and somewhat exaggerated scenario. In many usage scenarios, controller 32 will be pointed substantially toward a television or other display, and any relative misalignments between internal and external reference frames will be less severe. Nonetheless, the orientation inferring methods described herein may be used to assess a coarse orientation.

The assessed external-frame acceleration of controller 32 may differ from the actual controller acceleration due to one or more of the following factors: noise and error in the data visually-observed by stereo cameras 36, noise and error in the accelerometer data, and/or misalignment between the internal reference frame and the external reference frame. However, an inferred coarse orientation of controller 32, which is found as described herein, is absolute, rather than relative, and therefore does not accumulate error over time.

In some embodiments, orientation inferring subsystem 40 may be further configured to update the coarse orientation of controller 32 based on angular motion information observed by controller 32. The controller 32 may obtain the angular motion information in any suitable manner. One such suitable manner includes obtaining the angular motion information by means of an angular-motion measuring subsystem 44 configured to report angular motion information to the orientation inferring subsystem 40. In some embodiments, the angular-motion measuring subsystem may include spaced-apart three-axis accelerometers configured to be used in combination to determine the angular motion of controller 32. As shown in FIG. 2, in such embodiments, one three-axis accelerometer 42 may be located at a head end of controller 32 and another three-axis accelerometer 46 may be located at a tail end of controller 32, such that subtracting a head acceleration direction obtained by the head accelerometer 42 from a tail acceleration direction obtained by the tail accelerometer 46 yields an orientation change of controller 32 in the internal reference frame relative to controller 32. In other embodiments, such an angular-motion measuring subsystem 44 may include a three-axis gyroscope 48 which calculates the angular velocity of controller 32, which can then be integrated over time to determine an angular position.

In between frames where a coarse orientation is available (e.g., if target 41 does not move sufficient distance for detection by stereo cameras 36), measurements from the angular-motion measuring subsystem 44 may accumulate error. A long period of very slow motion, as might well happen when drawing, is the worst-case scenario. However, such a situation is the best-case scenario for smoothing and filtering the accelerometer data, because it is expected that a user will attempt to draw smooth lines and curves.

Controller 32 may report acceleration information and/or angular motion information to orientation inferring subsystem 40 by any suitable means. In some embodiments, controller 32 may report acceleration information and/or angular motion information by wirelessly transmitting such information to orientation inferring subsystem 40, as schematically shown in FIG. 2. In other embodiments, controller 32 may be physically connected to orientation inferring subsystem 40.

Figure 4:
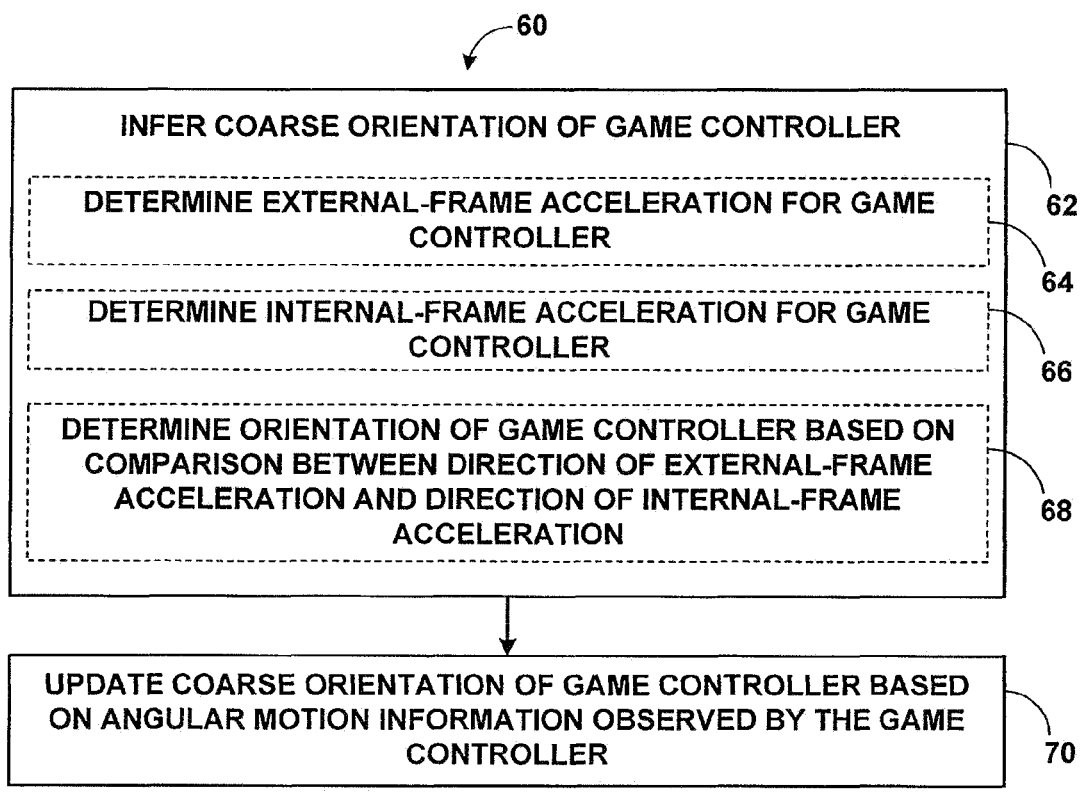
FIG. 4 shows a process flow of an example method of tracking an orientation of a game controller.

FIG. 4 shows a process flow diagram of an example method 60 of tracking an orientation of a game controller. Method 60 begins at 62 by inferring a coarse orientation of the game controller. At 64, method 60 includes determining an external-frame acceleration for the game controller, the external-frame acceleration being in an external reference frame relative to the game controller. At 66, method 60 includes determining an internal-frame acceleration for the game controller, the internal-frame acceleration being in an internal reference frame relative to the game controller. At 68, method 60 includes determining an orientation of the game controller based on a comparison between a direction of the external-frame acceleration and a direction of the internal-frame acceleration, as explained above. Upon inferring a coarse orientation of the game controller, method 60 may optionally include, at 70, updating the coarse orientation of the game controller based on angular motion information observed by the game controller.

In some embodiments, an unscented Kalman filter may be used to combine three-dimensional position tracking from stereo cameras, angular velocity information from gyroscopes, and acceleration information from accelerometers into a unified estimate of position and absolute orientation of the device. An unscented Kalman filter may be appropriate because of nonlinearities that may be introduced in the observation part of the process model (i.e., using the orientation to correct accelerometers). An extended Kalman filter may alternatively be used.

The Kalman filter approach combines the information provided from all sensors and allows the introduction of (Gaussian) noise models for each of the sensors. For example, any noise associated with position estimates from the cameras can be incorporated directly into the model. Similarly, the noise of the gyroscopes and accelerometers may be represented by the model. By tuning each of these separately, the system may favor the more reliable sensors without neglecting less reliable sensors.

The Kalman state, state transition, and observation model are described as follows, and the standard Kalman filter equations are used thereafter. At each frame, the state is updated with the state transition model, and predicted sensor values are computed from state estimates given the observation model. After the filter is updated, an updated position and orientation information is "read" from the updated state vector.

The Kalman state $\{x, \dot{x}, \ddot{x}, q, \omega\}$ includes information to be represented and carried from frame to frame, and is described as follows:

x is a 3D position of the device (3-vector);
$\dot{x}$ is a velocity of the device (3-vector);
$\ddot{x}$ is an acceleration of the device (3-vector);
q is a device orientation (quaternion); and
$\omega$ is an angular velocity: change in yaw, pitch and roll in the device coordinate frame (3-vector).

Next, a state transition is used to advance the state to the next time step based on process dynamics (velocity, acceleration, etc.). The state transition is described mathematically as follows:

$$x'=x+\dot{x}$$

$$\dot{x}'=\dot{x}+\ddot{x}$$

$$\ddot{x}'=\ddot{x}$$

$$q'=q \cdot q(\omega)$$

where:
$q(\omega)$ is a quaternion formed from a change in yaw, pitch, and roll.

Next the sensed values are "observed" from the state, as follows:
z is a 3D position from a stereo camera system (3-vector);
gyro are gyroscope values including change in yaw, pitch and roll (3-vector);
a is accelerometer values (3-vector);
g is a direction of gravity (3-vector);
where:

$$z=x;$$

$$\text{gyro}=\omega;$$

$$a=(\ddot{x}-g)R(q)$$

where:
R(q) is a rotation matrix formed from the quaternion q.

The last equation is the focus, where the accelerometer values are predicted by combining the effects of acceleration due to motion of the device, the effect of gravity, and the absolute orientation of the device. Discrepancies in the predicted values are then propagated back to the state by way of the standard Kalman update equations.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof. Furthermore, U.S. Pat. No. 6,982,697 is hereby incorporated herein by reference for all purposes.

The invention claimed is:

1. A system comprising:
   an orientation inferring subsystem including a monitor configured to visually observe a motion of an object relative to the monitor;
   a position inferring subsystem including a target monitor coupled to the object and configured to determine a coarse position of the object relative to a target separate from the object; and
   a gaming subsystem for using the observed motion from the orientation inferring subsystem and the determined coarse position from the position inferring subsystem to control a game function.

2. The system of claim 1 wherein the monitor includes at least one camera.

3. The system of claim 1 wherein the target monitor includes at least one camera.

4. The system of claim 2 wherein an external frame of acceleration of the object is determined using time-elapsed position information received by the at least one camera.

5. The system of claim 2 wherein the at least one camera is used to visually observe the object using infrared light.

6. The system of claim 2 wherein the orientation inferring subsystem updates an orientation of the object based on angular information.

7. The system of claim 1 wherein the orientation inferring subsystem infers an orientation of the object relative to a display or a television.

8. The system of claim 3 wherein the at least one camera in the position inferring subsystem is used to determine a three-dimensional position of the object.

9. An apparatus comprising:
   a monitor configured to visually observe a motion of an object relative to the monitor;
   a target monitor coupled to the object and configured to determine a coarse position of the object relative to a target separate from the object; and
   a gaming device for processing the observed motion from the monitor and the determined coarse position from the target monitor to control a game function.

10. The apparatus of claim 9 wherein the monitor includes at least one camera.

11. The apparatus of claim 9 wherein the target monitor includes at least one camera.

12. The apparatus of claim 10 wherein an external frame of acceleration of the object is determined using time-elapsed position information received by the at least one camera.

13. The apparatus of claim 10 wherein the at least one camera is used to visually observe the object using infrared light.

14. The apparatus of claim 10 wherein the monitor updates an orientation of the object based on angular information.

15. The apparatus of claim 9 wherein the monitor infers an orientation of the object relative to a display or a television.

16. The apparatus of claim 11 wherein the at least one camera is used to determine a three-dimensional position of the object.

17. A method comprising:
    observing a motion of an object relative to a monitor;
    determining a coarse position of the object relative to a target separate from the object; and
    processing the observed motion from the monitor and the determined coarse position from a target monitor; and
    controlling a game function with the processed observed motion and determined coarse position.

18. The method of claim 17 wherein the monitor includes at least one camera.

19. The method of claim 17 wherein the target monitor includes at least one camera.

20. The method of claim 18 further comprising determining an external frame of acceleration of the object using time-elapsed position information received by the at least one camera.

21. The method of claim 18 wherein the observing further comprises observing the object using infrared light.

22. The method of claim 18 further comprising updating an orientation of the object based on angular information.

23. The method of claim 17 further comprising inferring an orientation of the object relative to a display or a television.

24. The method of claim 19 wherein the determining further comprises determining a three-dimensional position of the object using the at least one camera.

* * * * *